(12) United States Patent
Douma

(10) Patent No.: US 9,408,494 B2
(45) Date of Patent: Aug. 9, 2016

(54) BEVERAGE MAKER, COMPRISING AN EASY-TO-CLEAN DUCT SYSTEM HAVING AT LEAST ONE DUCT FOR CONVEYING A FLUID BEVERAGE INGREDIENT

(75) Inventor: Sipke Theo Douma, Haren (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1121 days.

(21) Appl. No.: 12/669,519

(22) PCT Filed: Feb. 15, 2008

(86) PCT No.: PCT/IB2008/050553
§ 371 (c)(1),
(2), (4) Date: Jan. 18, 2010

(87) PCT Pub. No.: WO2008/102289
PCT Pub. Date: Aug. 28, 2008

(65) Prior Publication Data
US 2010/0224076 A1    Sep. 9, 2010

(30) Foreign Application Priority Data

Feb. 20, 2007   (EP) .................................... 07102719

(51) Int. Cl.
*A47J 31/44*   (2006.01)

(52) U.S. Cl.
CPC .................................. *A47J 31/4485* (2013.01)

(58) Field of Classification Search
CPC ....... A47J 31/44; A47J 31/4485; A47J 31/46; A47J 31/06; A47J 31/0626; A47J 31/4406; A47J 31/4475; A47J 31/4489; A23L 2/52; A23L 2/00; A23L 2/54; E03B 5/00

USPC ............. 99/289 R, 290–293, 323.1, 294, 300
See application file for complete search history.

(56) References Cited

U.S. PATENT DOCUMENTS

| 463,950 | A | * | 11/1891 | Hutchings | ........................ 99/293 |
| 484,447 | A | * | 10/1892 | Overman | ........................ 99/293 |
| 630,666 | A | * | 8/1899 | Cummings | ..................... 99/293 |
| 1,120,129 | A | * | 12/1914 | Cable | ............................. 261/116 |
| 1,496,493 | A | * | 6/1924 | Sell | ................................. 99/288 |
| 1,698,527 | A | * | 1/1929 | Bailey | .............................. 99/310 |
| 3,589,272 | A | * | 6/1971 | Bouladon et al. | ............... 99/295 |
| 4,382,402 | A | * | 5/1983 | Alvarez | .......................... 99/295 |

(Continued)

FOREIGN PATENT DOCUMENTS

| DE | 20204085 U1 | 5/2002 |
| EP | 1593330 A2 | 11/2005 |

(Continued)

*Primary Examiner* — Dana Ross
*Assistant Examiner* — Brandon Harvey

(57) ABSTRACT

A beverage maker for making a beverage includes a duct system having at least one duct for conveying a fluid beverage ingredient, and at least two elements for defining the duct system, which are configured to be fitted closely together. Recesses are arranged in a surface of at least one of these two elements, and serve for defining the ducts of the duct system. The duct system is further configured to convey steam besides the fluid beverage ingredient, where the steam serves for heating and pumping the fluid beverage ingredient. Furthermore, the duct system may also include at least one duct for supplying air to the fluid beverage ingredient, so that a frothed beverage may be obtained.

13 Claims, 4 Drawing Sheets

(56) References Cited

U.S. PATENT DOCUMENTS

| | | | | |
|---|---|---|---|---|
| 4,398,454 A | * | 8/1983 | Lambros et al. | 99/285 |
| 4,620,953 A | * | 11/1986 | Silla et al. | 261/142 |
| 4,644,856 A | * | 2/1987 | Borgmann | 99/295 |
| 4,645,603 A | * | 2/1987 | Frankl | 210/629 |
| 4,757,753 A | * | 7/1988 | Pandolfi | 99/290 |
| 4,779,519 A | * | 10/1988 | Giuliano | 99/275 |
| 4,922,810 A | * | 5/1990 | Siccardi | 99/323.1 |
| 4,960,042 A | | 10/1990 | Grossi | |
| 5,010,221 A | * | 4/1991 | Grossman et al. | 219/689 |
| 5,104,666 A | * | 4/1992 | Sanvitale | 426/77 |
| 5,189,949 A | * | 3/1993 | Apa | 99/453 |
| 5,197,374 A | * | 3/1993 | Fond | 99/295 |
| 5,233,915 A | * | 8/1993 | Siccardi | 99/293 |
| 5,242,702 A | * | 9/1993 | Fond | 426/433 |
| 5,243,164 A | * | 9/1993 | Erickson et al. | 219/689 |
| 5,265,519 A | * | 11/1993 | Schiettecatte et al. | 99/293 |
| 5,300,308 A | * | 4/1994 | Louridas | 426/112 |
| 5,327,815 A | * | 7/1994 | Fond et al. | 99/295 |
| 5,330,266 A | * | 7/1994 | Stubaus | 366/101 |
| 5,339,725 A | * | 8/1994 | De'Longhi | 99/293 |
| 5,473,972 A | * | 12/1995 | Rizzuto et al. | 99/290 |
| 5,603,257 A | * | 2/1997 | Kateman et al. | 99/455 |
| 5,605,089 A | * | 2/1997 | Yu | 99/306 |
| 5,605,710 A | * | 2/1997 | Pridonoff et al. | 426/86 |
| 5,611,262 A | | 3/1997 | Rizzuto et al. | |
| 5,649,472 A | * | 7/1997 | Fond et al. | 99/295 |
| 5,769,135 A | * | 6/1998 | Mahlich | 141/70 |
| 5,778,765 A | * | 7/1998 | Klawuhn et al. | 99/290 |
| 5,785,256 A | * | 7/1998 | Mahlich | 239/552 |
| 5,862,740 A | | 1/1999 | Grossi | |
| 5,884,552 A | * | 3/1999 | Lussi et al. | 99/323.1 |
| 6,006,654 A | * | 12/1999 | Pugh | 99/293 |
| 6,019,032 A | * | 2/2000 | Arksey | 99/452 |
| 6,082,713 A | * | 7/2000 | King | 261/79.2 |
| 6,161,469 A | * | 12/2000 | Rolla | 99/293 |
| 6,192,785 B1 | * | 2/2001 | Trida et al. | 99/284 |
| 6,222,160 B1 | * | 4/2001 | Remke et al. | 219/387 |
| 6,253,667 B1 | * | 7/2001 | Lussi et al. | 99/455 |
| 6,289,796 B1 | * | 9/2001 | Fung | 99/453 |
| 6,293,187 B1 | * | 9/2001 | Zils | 99/323.1 |
| 6,324,963 B1 | * | 12/2001 | Cirasole | 99/285 |
| 6,622,615 B2 | | 9/2003 | Heczko | |
| 6,681,685 B2 | * | 1/2004 | Mahlich | 99/453 |
| 6,832,542 B2 | * | 12/2004 | Hu et al. | 99/302 R |
| 6,840,158 B2 | * | 1/2005 | Cai | 99/323.1 |
| 6,840,163 B2 | * | 1/2005 | Oldani et al. | 99/453 |
| 7,069,843 B2 | * | 7/2006 | Paoletti | 99/453 |
| 7,225,727 B2 | * | 6/2007 | Oldani et al. | 99/293 |
| 7,489,860 B2 | * | 2/2009 | Startz | 392/478 |
| 7,946,219 B2 | * | 5/2011 | Marconi | 99/323.1 |
| 7,992,488 B2 | * | 8/2011 | Mahlich et al. | 99/287 |
| 8,113,107 B2 | * | 2/2012 | Fraij et al. | 99/323.3 |
| 2002/0017321 A1 | * | 2/2002 | Schroeder | 137/240 |
| 2002/0178932 A1 | * | 12/2002 | Cai | 99/516 |
| 2003/0005826 A1 | * | 1/2003 | Sargent et al. | 99/279 |
| 2003/0085237 A1 | * | 5/2003 | Kateman et al. | 222/1 |
| 2003/0089245 A1 | * | 5/2003 | Kollep et al. | 99/495 |
| 2003/0106433 A1 | * | 6/2003 | Oldani et al. | 99/279 |
| 2003/0131735 A1 | * | 7/2003 | Johnson et al. | 99/275 |
| 2003/0159589 A1 | * | 8/2003 | Meador | 99/295 |
| 2003/0172816 A1 | * | 9/2003 | Mahlich | 99/453 |
| 2003/0232115 A1 | * | 12/2003 | Eckenhausen et al. | 426/477 |
| 2004/0107841 A1 | * | 6/2004 | Cai | 99/302 R |
| 2004/0107843 A1 | * | 6/2004 | Oldani et al. | 99/452 |
| 2004/0177760 A1 | * | 9/2004 | Eicher | 99/275 |
| 2004/0231521 A1 | * | 11/2004 | Yoakim | 99/275 |
| 2005/0115419 A1 | * | 6/2005 | Oldani et al. | 99/453 |
| 2005/0279215 A1 | * | 12/2005 | Cai | 99/279 |
| 2006/0201332 A1 | * | 9/2006 | Klopfenstein | 99/293 |
| 2006/0272516 A1 | * | 12/2006 | Carbonini | 99/452 |
| 2007/0056449 A1 | * | 3/2007 | Di Giampaolo et al. | 99/452 |
| 2007/0158366 A1 | * | 7/2007 | Van Deer Meer et al. | 222/222 |
| 2008/0250937 A1 | * | 10/2008 | Fraij et al. | 99/295 |
| 2009/0011105 A1 | * | 1/2009 | Mahlich et al. | 426/564 |
| 2009/0104336 A1 | * | 4/2009 | Fraij et al. | 426/590 |
| 2009/0220659 A1 | * | 9/2009 | Ranzoni | 426/433 |

FOREIGN PATENT DOCUMENTS

| | | |
|---|---|---|
| EP | 1820429 A1 * | 8/2007 |
| WO | 2005063093 A1 | 7/2005 |
| WO | 2006131857 A1 | 12/2006 |
| WO | WO 2007036856 A2 * | 4/2007 |

\* cited by examiner

BEVERAGE MAKER, COMPRISING AN EASY-TO-CLEAN DUCT SYSTEM HAVING AT LEAST ONE DUCT FOR CONVEYING A FLUID BEVERAGE INGREDIENT

FIELD OF THE INVENTION

The present invention relates to a beverage maker, comprising a duct system having at least one duct for conveying a fluid beverage ingredient. The fluid beverage ingredient may be milk, for example, and the beverage maker may be adapted to subject the milk to a frothing process and a heating process.

BACKGROUND OF THE INVENTION

Currently, there is a range of methods for milk heating and milk frothing in coffee, espresso and cappuccino appliances, wherein steam is generated and supplied to the milk. The present invention will be explained and described in the context of these appliances, which does not alter the fact that the present invention also relates to other types of beverage makers, wherein the fluid beverage ingredient to be conveyed by the duct system of the beverage maker does not necessarily need to be milk.

According to a frequently used method, steam is used for both the purpose of heating milk and the purpose of pumping the milk out of a package or reservoir. In particular, the duct system may be connected to both a steam generator and the milk package or reservoir, wherein a geometry of the duct system may be such that the milk is drawn out of the package or reservoir under the influence of a flow of steam. A problem associated with the known beverage maker is that it is bothersome and time-consuming to clean the duct system after use. Especially a hose or tube for connecting the duct system to the milk package or reservoir is difficult to clean.

Over time, various solutions to the above-mentioned problem have been proposed. For example, disposable milk containers and disposable cartridges having a duct system for pumping, heating and frothing the milk may be applied, wherein there is no longer a need for cleaning, as used containers and cartridges may simply be thrown away and replaced by fresh containers and cartridges. However, the use of disposables is disadvantageous, as it involves relatively high costs and a relatively high environmental impact.

U.S. Pat. No. 5,611,262 discloses a cappuccino maker which has a milk receptacle and a base for the milk receptacle. The base has a lip extending upward from its edges to form a reservoir. When the milk receptacle is disengaged from the base, the cappuccino maker can be cleaned by pouring water or another cleaning fluid into the reservoir and activating the cappuccino maker. In this way, a milk frothing apparatus of the cappuccino maker is flushed of undesirable residue or buildup, wherein there is no need to empty the milk receptacle.

U.S. Pat. No. 4,960,042 discloses a device for frothing and heating milk for beverages. For the purpose of cleaning the device, the device is dismantled, wherein parts in contact with the milk and subject to incrustation by the formation of froth deposits are unscrewed from their locations, so that these parts can be placed in dishwashers or similar machines.

WO 2005/063093 discloses a device for preparing a heated liquid for use with a beverage making appliance. Skimmed milk is disclosed as an example of the liquid. The device comprises a liquid transport channel in communication with a liquid reservoir which discharges into a first chamber, said first chamber comprising a steam inlet which is connectable to a steam generator, and a second chamber which is connected to the first chamber via a restriction and which has a liquid outlet. In one embodiment, the liquid reservoir is a refillable reservoir. In that case, the liquid reservoir is provided in an element which is moveable between a first position in which it covers the liquid transport channel, the first chamber, the steam inlet, the restriction, the second chamber, and the liquid outlet during operation, and a second position in which it leaves these components exposed for cleaning purposes in a non-operating status.

SUMMARY OF THE INVENTION

It is an objective of the present invention to provide a beverage maker which is designed in such a way that parts of the beverage maker contacting a fluid beverage ingredient such as milk are easy to clean in a most effective manner, wherein there is no need for bothersome preliminary work such as unscrewing parts from their locations.

According to the present invention, a beverage maker which comprises a duct system having at least one duct for conveying a fluid beverage ingredient is provided, wherein the duct system is defined by at least two elements which are removably arranged with respect to each other, wherein each element has a contact surface for closely contacting a contact surface of the other element, and wherein the ducts of the duct system are defined by recesses which are arranged in an area of the contact surface of at least one of the elements, characterized in that the elements are shaped like a cup, wherein one of the elements constitutes an inner cup of the assembly of the elements, wherein another of the elements constitutes an outer cup of the assembly of the elements, and wherein the inner cup is adapted to be tightly fitted in the outer cup.

On the basis of the fact that the duct system of the beverage maker is defined by at least two elements which are removably arranged with respect to each other, wherein each element has a contact surface for closely contacting a contact surface of the other element, it is very easy to obtain full access to an interior of the ducts of the duct system, namely by taking the elements apart. As the ducts of the duct system are defined by recesses which are arranged in an area of the contact surface of at least one of the elements, there is no need for hoses or tubes for conveying the fluid beverage ingredient, which can only be cleaned by flushing with water or another suitable cleaning fluid. All that needs to be done for the purpose of cleaning the duct system of the beverage maker is taking the elements apart, so that the duct geometry is revealed, and cleaning these elements. The cleaning process is relatively simple, because this process only involves cleaning of surfaces of the elements, wherein each portion of the these surfaces may be easily put in contact with water or another suitable cleaning fluid and/or a device for brushing or scrubbing the surfaces.

The easy cleaning as described in the foregoing is obtained on the basis of the fact that the elements may be taken apart, whereby the ducts of the duct system are opened. In particular, the elements may be taken from an assembled condition in which the contact surfaces of the elements are closely contacting each other to a disassembled condition, and vice versa. In the process, at least one of the elements may be removed from the beverage maker, but a possibility according to which the elements are taken apart while remaining in the beverage maker is also feasible within the scope of the present invention. For example, the elements may be positioned in parts of the beverage maker which are hingably connected to each other.

Preferably, an assembly of the elements is adapted to receive and contain a quantity of the fluid beverage ingredient to be conveyed by the duct system. In this way, there is no need for an additional element for doing so, which is advantageous in view of the compactness of the beverage maker. A practical way of realizing a fluid receiving and containing function of the elements defining the duct system is shaping these elements like a cup, wherein one of the elements constitutes an inner cup of the assembly of the elements, wherein another of the elements constitutes an outer cup of the assembly of the elements, and wherein the inner cup is adapted to be tightly fitted in the outer cup. In that case, when the elements are in the assembled condition, the fluid beverage ingredient may be contained in the interior space of the inner cup. For the purpose of allowing the fluid beverage ingredient to enter the duct system which is present between the inner cup and the outer cup, the inner cup has at least one hole for providing access to a duct of the duct system. Advantageously, such a hole is located at a bottom of the inner cup, so that it is possible to remove all fluid from the inner cup.

When the elements are shaped like an inner cup and an outer cup, so that an inner one of the elements is suitable to be fitted in an outer one of the elements, the recesses forming the ducts may be arranged in an outer surface of the inner element, an inner surface of the outer element, or both.

It is possible that the duct system is adapted to convey a fluid for pumping the fluid beverage ingredient, besides the fluid beverage ingredient. For example, the duct system is suitable for conveying both milk and steam, wherein the steam is used for pumping the milk, besides heating the milk. The duct system may have any suitable geometry for realizing a pumping effect of one fluid to another. The geometry of the duct system may be such that a pumping action is obtained on the basis of a principle known as ejector principle, according to which a flow of a first fluid is generated under the influence of a local underpressure that is obtained by allowing for a transfer of momentum from a flow of a second fluid to the first fluid. However, the geometry of the duct system may also be suitable for realizing a pumping action on the basis of a principle known as the venturi principle, according to which a first fluid is sucked in a chamber under the influence of a local underpressure that is obtained by successively conducting a second fluid through a restriction and supplying the second fluid to the chamber. Within the scope of the present invention, it is also possible that the geometry of the duct system is adapted to cause a pumping action on the basis of a combination of the ejector principle and the venturi principle, or on the basis of another principle. In any case, an advantageous consequence of the application of a principle according to which a flow of one fluid causes a flow of another fluid is that there is no need for applying a separate pump.

In general, for the purpose of allowing one fluid to perform a pumping action on another fluid, the duct system may comprise a main duct and at least one subsidiary duct merging into the main duct.

It is noted that in a duct system for realizing a pumping effect on the basis of the ejector principle, a longitudinal axis of the subsidiary duct extends at an angle smaller than 90° with respect to a longitudinal axis of the main duct at the position where the subsidiary duct merges into the main duct, wherein at least a portion of the main duct extending between this position and an outlet of the duct system has a constant cross-sectional area over its length. Otherwise, in a duct system for realizing a pumping effect on the basis of the venturi principle, an end portion of the subsidiary duct, through which the subsidiary duct is connected to the main duct, is restricted, wherein a portion of the main duct, into which the subsidiary duct merges, is widened.

In order to realize an effective pumping action, when the pumping fluid is steam, it is preferred if a cross-sectional area of the subsidiary duct is smaller than a cross-sectional area of the main duct. Furthermore, when the pumping fluid is steam, it is advantageous if an inlet of the main duct is connected to a supplying arrangement for supplying the fluid beverage ingredient, and an inlet of the subsidiary duct is connected to a supplying arrangement for supplying the steam.

In view of the fact that steam is suitable to be used for pumping another fluid through a duct system, an embodiment of the beverage maker which further comprises a steam generator, wherein at least one inlet member of the duct system is connected to the steam generator is feasible within the scope of the present invention.

With respect to the steam generator, it is noted that the beverage maker may comprise a refillable water tank for containing water and a water supplying arrangement for supplying water to the steam generator during operation of the beverage maker, in any suitable manner known per se. It is also possible that the steam generator is connected to the water mains. It is noted that in case one or more fluid beverage ingredients comprise water, the relevant inlet or inlets of the duct system of the beverage maker may also be connected to the water tank or the water mains.

In a manner known per se, frothing of the fluid beverage ingredient may be obtained when the duct system has at least one inlet hole for letting in air. Means for closing the hole when it is not desired to obtain a frothed fluid may also be provided.

The present invention also relates to a unit which is intended to be used in any type of beverage maker which falls within the scope of the present invention, wherein this unit comprises the duct system and the elements for defining the duct system. The unit may be suitable to be fixedly or removably arranged in the beverage maker. The latter option is of practical use in case the elements defining the duct system are movably arranged with respect to each other while being fixed to the unit, so that the unit may be removed from the beverage maker when it is desired to clean the elements.

The above-described and other aspects of the present invention will be apparent from and elucidated with reference to the following description of two elements for defining a duct system of a beverage maker according to the present invention.

BRIEF DESCRIPTION OF THE DRAWINGS

The present invention will now be explained in greater detail with reference to the figures, in which equal or similar parts are indicated by the same reference signs, and in which.

DETAILED DESCRIPTION OF AN EMBODIMENT

Figure 1:
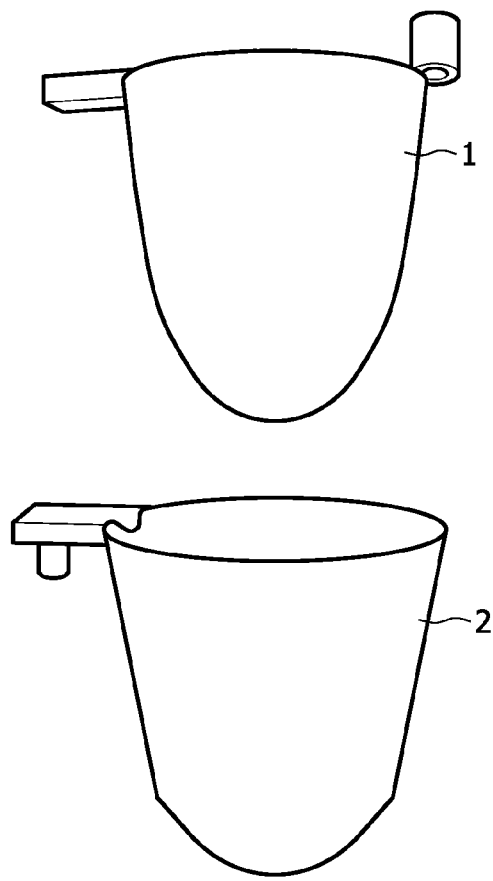
FIG. 1 diagrammatically shows two elements of a beverage maker according to the present invention, namely an inner cup and an outer cup, which are adapted to define a duct system of the beverage maker and to constitute a container for containing a fluid beverage ingredient.

FIG. 1 shows two elements 1, 2 of a beverage maker according to the present invention. The beverage maker as such is not shown, as the present invention is embodied in the elements 1, 2, and it is assumed that the general design of a beverage maker is commonly known. In the following, it is assumed that the beverage maker is suitable to be used for the purpose of heating and frothing milk, which does not alter the fact that the present invention also applies to other types of beverage makers, including beverage makers which are intended to be used for the purpose of processing other fluids than milk, and beverage makers which serve for preparing a cool beverage. In many cases, a beverage maker which is suitable to be used for the purpose of heating and frothing milk is also suitable to be used for the purpose of making coffee or a coffee-based beverage such as cappuccino or espresso. The way in which these beverage making processes are performed is known per se and will not be elucidated here.

The dimensions of the elements 1, 2 are chosen such that the elements 1, 2 may be closely fitted together for defining a duct system having ducts for conveying milk, steam and air. In FIG. 1, the elements 1, 2 are shown in a disassembled condition, whereas in FIG. 2, the elements 1, 2 are shown in an assembled condition. Details of the duct system will later be explained with reference to FIGS. 5-8. For sake of clarity, features of the elements 1, 2 relating to the duct system are not shown in FIG. 1.

Figure 3:
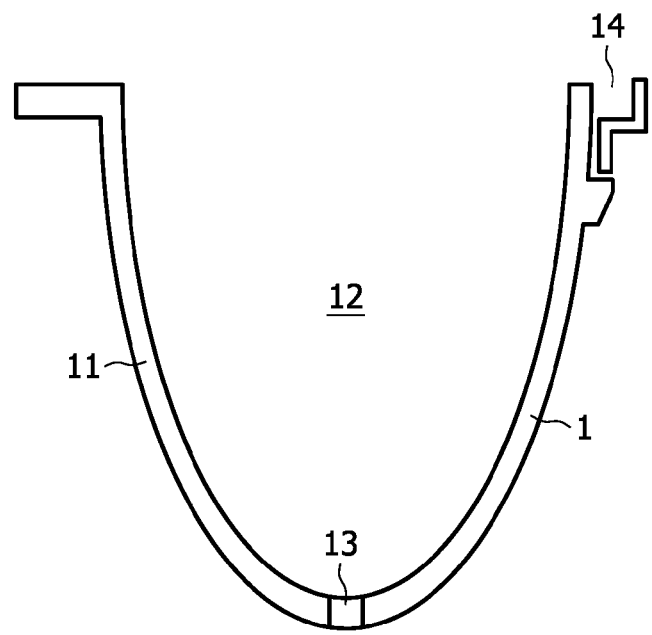
FIG. 3 diagrammatically shows a side view of a longitudinal section through the inner cup.
Figure 4:
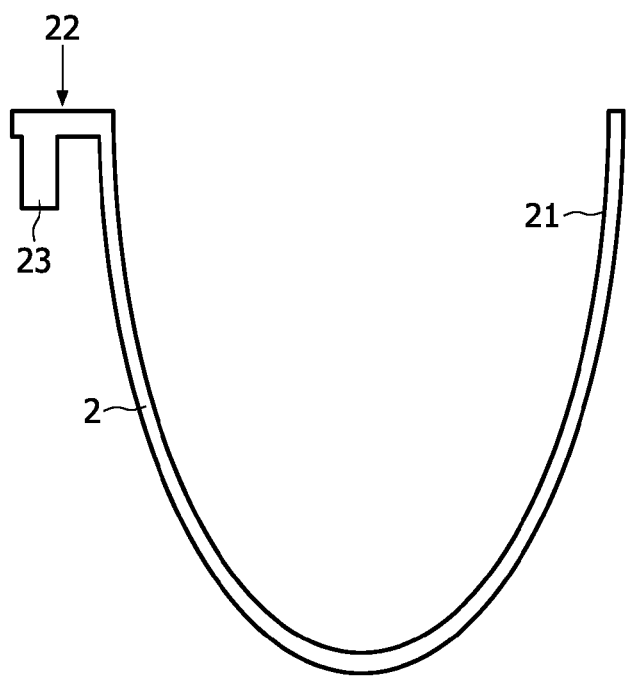
FIG. 4 diagrammatically shows a side view of a longitudinal section through the outer cup.
Figure 5:
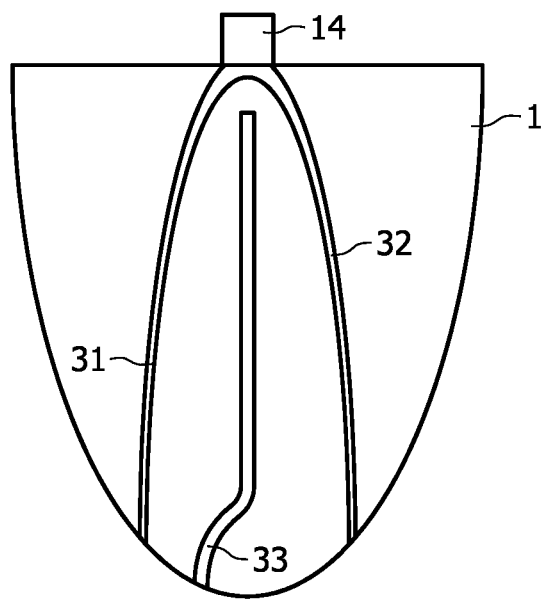
FIGS. 5 and 6 show views of opposite sides of the inner cup.
Figure 6:
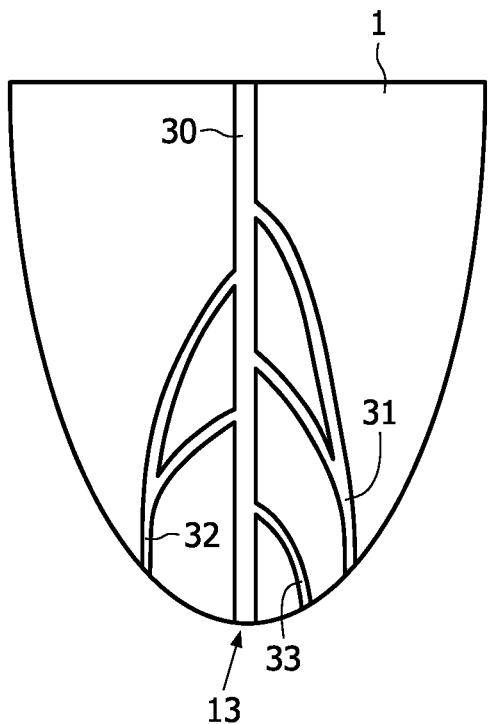
Figure 7:
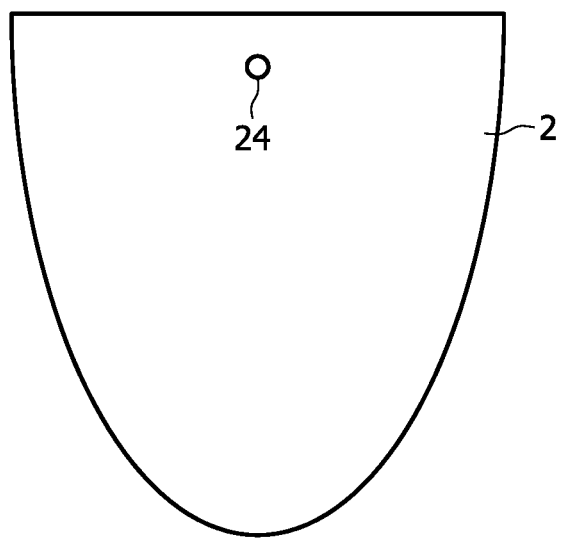
FIGS. 7 and 8 show views of opposite sides of the outer cup.
Figure 8:
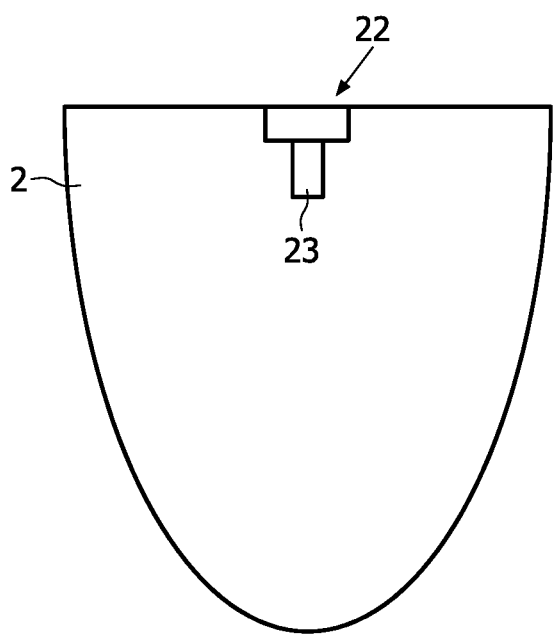

In FIGS. 3 and 4, side views of longitudinal sections through the elements 1, 2 are shown, wherein it is clearly shown that the elements 1, 2 are shaped like cups. Therefore, in the following, the elements 1, 2 will be referred to as cups 1, 2, wherein one of the elements 1, 2, namely the element 1 having the smallest radial dimensions is referred to as inner cup 1, and wherein another of the elements 1, 2, namely the element 2 having the largest radial dimensions is referred to as outer cup 2. The inner cup 1 is adapted to be closely fitted in the outer cup 2, wherein a contact surface 11 of the inner cup 1, which is located at an outside of the inner cup 1, serves for closely contacting a contact surface 21 of the outer cup 2, which is located at an inside of the outer cup 2. It is noted that in the shown example, a shape of a cross-section of the cups 1, 2 is circular. Nevertheless, the cross-section of the cups 1, 2 may also have another suitable shape.

Figure 2:
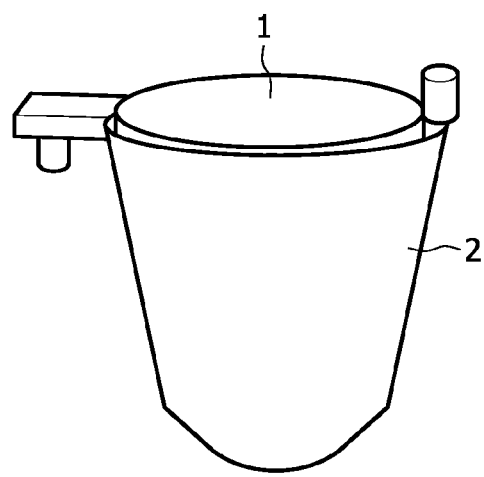
FIG. 2 diagrammatically shows the cups shown in FIG. 1, in an assembled condition.

When the cups 1, 2 are in the assembled condition as shown in FIG. 2, the duct system is enclosed between the cups 1, 2. Furthermore, the inner cup 1 is suitable for receiving and containing a quantity of milk. For sake of completeness, it is noted that the cups 1, 2 are positioned in the beverage maker while being oriented as shown in the figures, i.e. with an open side up and a closed bottom down.

For the purpose of allowing milk to flow from a container space 12 of the inner cup to the duct system, a milk inlet hole 13 is arranged in the inner cup 1. In the shown example, this hole 13 is positioned at a centre of the bottom of the inner cup 1, as a result of which it is possible to supply all of a quantity of milk contained by the inner cup 1 to the duct system in a natural way, namely under the influence of gravity.

Furthermore, the inner cup 1 comprises a steam inlet member 14 for coupling to a steam supply member such as a steam hose (not shown). The beverage maker has a steam generator for generating steam on the basis of a supply of water, and the steam is used for heating the milk and pumping the milk through the duct system. For the purpose of letting out the milk of the duct system, the outer cup 2 comprises a milk outlet hole 22, which, in the shown example, is located at an upper side of the outer cup 2, i.e. at a side of the outer cup 2 where the outer cup 2 is open. A milk outlet member 23 is connected to the outer cup 2 at the position of the milk outlet hole 22, and serves for conducting an outgoing flow of milk in a practical downward direction.

An advantageous possibility of the geometry of the duct system is illustrated in FIGS. 5-8. It is shown that an outer surface of the inner cup 1 is provided with groove-shaped recesses. In particular, the recesses are arranged in the outer surface of the inner cup 1 in such a way, that one main groove 30 is realized, which is extending from the milk inlet hole 13 to the location of the milk outlet hole 22.

Starting from the location of the steam inlet member 14, two subsidiary grooves 31, 32 are realized, which are merging into the main groove 30. These subsidiary grooves 31, 32 serve for conveying steam, and will therefore also be referred to as steam conveying grooves 31, 32. In particular, each of the steam conveying grooves 31, 32 is merging into the main groove 30 at two different positions along a longitudinal axis of the main groove 30. This is advantageous in view of the fact that local boiling of the milk under the influence of a supply of steam is prevented in this way, as the total quantity of the steam which is needed for the purpose of putting the milk to a predetermined temperature is supplied in separate portions. Furthermore, more homogeneous heating of the milk is realized. Another advantage of the shown configuration of the main groove 30 and the steam conveying grooves 31, 32 is that the extent to which the milk and the steam get mixed is enhanced. During operation, the steam is supplied to a flow containing the milk at several different positions, so that the steam is supplied to the flow containing the milk in a more even fashion. This is all the more true when the flows of steam are allowed to merge into the flow containing the milk from different sides, as is the case in the shown example.

In the geometry as shown in the figures, a longitudinal axis of each of the steam conveying grooves 31, 32 extends at an angle smaller than 90° with respect to a longitudinal axis of the main groove 30 at the position where the steam conveying groove 31, 32 merges into the main groove 30. Furthermore, a portion of the main groove 30 extending between this position and the milk outlet hole 22 has a constant cross-sectional area over its length. This allows for a pumping action of the steam on the milk on the basis of the ejector principle, according to which a flow of a first fluid is generated under the influence of a local underpressure that is obtained by allowing for a transfer of momentum from a flow of a second fluid to the first fluid. In this example, the first fluid is the milk, and the second fluid is the steam. It is noted that the geometry of the duct system may also be such that a pumping action is realized in a different manner during operation.

Yet another subsidiary groove 33 is extending from a position close to the steam inlet member 14 to the main groove 30, wherein the subsidiary groove 33 is merging into the main groove 30 at a position between the milk inlet hole 13 and the connection of the steam conveying grooves 31, 32. In particular, the subsidiary groove 33 serves for supplying air to the milk, and will therefore also be referred to as air supplying groove 33. For the purpose of letting in air to the air supplying groove 33, the outer cup 2 has an air inlet hole 24 which is located at a position substantially corresponding to the end of the air supplying groove 33 which is close to the steam inlet member 14, i.e. at a position near the upper side of the outer cup 2. This location of the air inlet hole 24 is advantageous in view of a prevention of leaking of milk from the inner cup 1 through a portion of the duct system and the air inlet hole 24, which might occur when the air inlet hole 24 would be positioned closer to the bottom of the outer cup 2.

When the inner cup 1 and the outer cup 2 are in the assembled condition, the grooves 30, 31, 32, 33 in the outer surface of the inner cup 1 are closed in an airtight manner by an inner surface of the outer cup 2. In this way, on the basis of the grooves 30, 31, 32, 33 and a closure of an open side of the grooves 30, 31, 32, 33 by the outer cup 2, the duct system having various ducts is realized. In the following, the closed main groove 30 will be referred to as main duct 30, the closed steam conveying grooves 31, 32 will be referred to as steam conveying ducts 31, 32, and the closed air supplying groove 33 will be referred to as air supplying duct 33.

Within the scope of the present invention, the shape of a cross-section of the ducts 30, 31, 32, 33 of the duct system may be any suitable shape. For example, the cross-section may be circular, rectangular, square or hexagonal. An advantage of a circular cross-section is that a relatively low flow resistance of the duct 30, 31, 32, 33 is obtained.

When the beverage maker is operated such as to heat and froth a quantity of milk, wherein the inner cup 1 and the outer cup 2 are in the assembled condition, the following process takes place. In the first place, the container space 12 of the inner cup 1 is filled with a quantity of milk. Furthermore, the steam generator of the beverage maker is operated, and steam is supplied to the duct system, through the steam inlet member 14 of the inner cup 1. The steam flows through the steam conveying ducts 31, 32 and reaches the main duct 30, wherein, on the basis of the geometry of the duct system, a pumping action of the steam on the milk is obtained, as has been explained in the foregoing. In the process, the milk flows from the container space 12 of the inner cup 1 to the main duct 30 through the milk inlet hole 13. Also, air is sucked in the main duct 30, through the air inlet hole 24 and the air supplying duct 33. All in all, a flow of milk is realized, wherein the milk is heated under the influence of a mixing process of the milk and the steam, and wherein the milk is frothed under the influence of the supply of air. Eventually, the heated and frothed milk exits the duct system through the milk outlet hole 22 and flows through the milk outlet member 23.

An important advantage of the beverage maker according to the present invention is that it is easy to clean the duct system, as all it takes to actually do so is taking the cups 1, 2 apart and cleaning the outer surface of the inner cup 1 and the inner surface of the outer cup 2. Another important advantage of this beverage maker is that an element for containing the milk to be heated and frothed is constituted by the element 1 for enclosing the duct system, so that there is no need for application of two separate elements, and space may be saved on the basis of the application of the element 1 having the dual functionality. Moreover, it is not necessary to apply a difficult-to-clean hose or the like for supplying the milk from a reservoir to the duct system which is defined by the cups 1, 2.

The cups 1, 2 may be part of a unit of the beverage maker which is removably arranged in the beverage maker. In that case, this unit may be taken out of the beverage maker when there is a need for cleaning the duct system. On the other hand, it is also possible that only one of the inner cup 1 and the outer cup 2 is removably arranged in the beverage maker, although it is preferred if both cups 1, 2 can be handled separately from the beverage maker, in order to facilitate cleaning of both cups 1, 2.

It will be clear to a person skilled in the art that the scope of the present invention is not limited to the examples discussed in the foregoing, but that several amendments and modifications thereof are possible without deviating from the scope of the present invention as defined in the attached claims. In any case, any suitable combination of the various advantageous features of the beverage maker according to the present invention as defined in the subclaims falls within the scope of the present invention. While the present invention has been illustrated and described in detail in the figures and the description, such an illustration and description are to be considered illustrative or exemplary only, and not restrictive. The present invention is not limited to the disclosed embodiment.

A feasible application of the beverage maker according to the present invention is an application for the purpose of preparing hot milk, as has been described in the foregoing. Preferably, for the purpose of such an application, milk is supplied to a main duct 30 of the duct system of the beverage maker, and steam is used for the purpose of heating the milk. For the purpose of heating the milk or possibly another beverage ingredient, it is not necessary to use steam. For example, it is also possible that hot water is supplied to the main duct 30.

Steam has the advantage that it is suitable to be used for both purpose of heating and pumping another fluid. Therefore, it is preferred to use steam and to have a steam generator in the beverage maker in case it is desired to displace and heat another fluid. Nevertheless, it is also possible that a pumping effect of a fluid to be displaced through the duct system is obtained in another way, for example, under the influence of a pumping device.

With respect to using elements, in particular the shown cups 1, 2, for forming the duct system on the basis of recesses in at least one of the elements 1, 2, it is noted that it is advantageous to do so in view of the fact that a manufacturing process of such elements 1, 2 may be easier than a process of assembling a number of hoses or tubes, as these elements 1, 2 may be manufactured of a suitable plastic and may be formed by using injection moulding techniques.

In order to improve froth quality and volume, obstructions (not shown) may be applied, which are arranged in a portion of the main duct 30 extending between the connection to the air supplying duct 33 and the milk outlet hole 22. By applying such obstructions, frothing of the fluid is enhanced, as the obstructions increase flow resistance and/or create some extra agitation.

Within the scope of the present invention, it is possible that measures are applied for the purpose of locally restricting the flow of the fluid beverage ingredient. For example, a portion of the main duct 30 may be narrowed, or obstacles may be arranged in this duct 30. In this way, a possibility of adapting a flow rate of the fluid beverage ingredient is obtained. The extent to which the flow of the fluid beverage ingredient is locally restricted may be adjustable. In case the fluid beverage ingredient is heated by steam, it is advantageous to have a possibility of controlling the flow rate of the fluid beverage ingredient, as in this way, a possibility of controlling the resulting temperature of the mixture that is obtained on the basis of the fluid beverage ingredient and the steam is created. In general, the resulting temperature of the mixture increases when the restriction to the flow of the fluid beverage ingredient increases.

In the shown example, the duct system of the beverage maker comprises two subsidiary ducts 31, 32 for supplying steam to the main duct 31, wherein each of these subsidiary ducts 31, 32 merges into the main duct 30 at two different positions along a longitudinal axis of the main duct 30. However, within the scope of the present invention, the number of steam conveying ducts 31, 32 and the number of connections of these steam conveying ducts 31, 32 to the main duct 30 may be chosen freely. Also, the number of steam inlet members 14 may be more than one.

In general, within the scope of the present invention, numerous possibilities of the number of ducts of the duct system and the configuration of these ducts exist. The duct system may be designed as the duct system shown in the figures, but may also be of a different design.

In the duct system of the beverage maker, an inlet may be arranged for letting in a dry substance such as cacao powder to the duct system. In such a case, a process of preparing a beverage also involves adding the dry substance.

Fluid which is supplied to fluid in the main duct 30, and which has a function in heating or cooling the fluid in the main duct 30, may be supplied in at least one subsidiary flow in such a way that a pumping action is obtained, and may be supplied in at least one other subsidiary flow which does not have a pumping effect at all. For example, in the duct system of the beverage maker according to the present invention, a supply of fluid which only leads to an increase of the temperature of the fluid in the main duct 30 may be realized in the form of a supply of fluid through a duct which is at right angles with the main duct 30. The temperature of the beverage to be prepared may be optimized by using one or more of such additional ducts, without influencing the pumping process that takes place in the duct system.

It has already been noted that the air supplying duct 33 may be closeable, wherein a valve or the like may be applied. In an alternative embodiment of the beverage maker, which is only suitable to be applied for the purpose of making a hot beverage without froth, the air supplying duct 33 may be omitted altogether. On the other hand, in a beverage maker which is adapted to froth a fluid beverage ingredient, more than one air supplying ducts 33 may be applied.

It is possible that the cups 1, 2 for defining the duct system of the beverage maker are used as disposables which need to be replaced after having been used in a process of preparing a beverage for a predetermined number of times. However, it is preferred of the cups 1, 2 are used as durable elements which are associated with the beverage maker, wherein the cups 1, 2 are cleaned whenever this is desired.

Variations to the disclosed embodiment can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

In the foregoing, a beverage maker for making a beverage on the basis of at least one fluid beverage ingredient has been described. The beverage maker comprises a duct system having at least one duct 30 for conveying the fluid beverage ingredient. Furthermore, the beverage maker comprises at least two elements 1, 2 for defining the duct system, which are adapted to be fitted closely together. Recesses 30, 31, 32, 33 are arranged in a surface of at least one of these two elements 1, 2, and serve for defining the ducts 30, 31, 32, 33 of the duct system. On the basis of this design of the beverage maker, it is achieved that the duct system is easy to clean, wherein a cleaning action simply involves taking the elements 1, 2 apart and cleaning their surfaces.

In a preferred embodiment of the beverage maker according to the present invention, the duct system is adapted to convey steam besides the fluid beverage ingredient, wherein the steam serves for heating the fluid beverage ingredient and pumping the fluid beverage ingredient through the duct system. Furthermore, the duct system may also comprise at least one duct 33 for supplying air to the fluid beverage ingredient, so that a frothed beverage may be obtained.

The invention claimed is:

1. A beverage maker, comprising:
   an outer element having a cup shape and internal and external surfaces;
   an inner element having a shape that complements the cup shape for fitting in the outer element and forming a duct system for conveying a fluid beverage ingredient such that all of the fluid beverage ingredient between the inner and outer elements flows through the duct system, the inner element further having an internal surface and an external surface, the external surface of the inner element having one or more recesses, wherein the external surface of the inner element is configured to removably contact the internal surface of the outer element;
   the duct system being formed between the one or more recesses and the internal surface of the outer element when the inner element is fitted in the outer element; and
   a steam generator, wherein the duct system includes at least one inlet member connected to the steam generator,
   wherein the inner element is configured to fit inside the outer element when the external surface of the inner element removably contacts the internal surface of the outer element to form the duct system.

2. The beverage maker according to claim 1, wherein the inner element is configured to receive a quantity of the fluid beverage ingredient to be conveyed by the duct system.

3. The beverage maker according to claim 1, wherein the duct system is configured to convey a fluid for pumping the fluid beverage ingredient.

4. A beverage maker, comprising:
   an outer element having a cup shape and internal and external surfaces;
   an inner element having a shape that complements the cup shape for fitting in the outer element and forming a duct system for conveying a fluid beverage ingredient such that all of the fluid beverage ingredient between the inner and outer elements flows through the duct system, the inner element further having an internal surface and an external surface, the external surface of the inner element having one or more recesses, wherein the external surface of the inner element is configured to removably contact the internal surface of the outer element; and
   the duct system being formed between the one or more recesses and the internal surface of the outer element when the inner element is fitted in the outer element,
   wherein the duct system comprises a main duct extending from an open section to a closed section of the inner element and at least one subsidiary duct, wherein the main duct has a longitudinal axis and an entry portion into which the at least one subsidiary duct merges, and wherein the at least one subsidiary duct has a longitudinal axis and an end portion for merging into the main duct, and
   wherein the inner element is configured to fit inside the outer element when the external surface of the inner element removably contacts the internal surface of the outer element to form the duct system.

5. A beverage maker comprising:
   a duct system for conveying a fluid beverage ingredient, wherein the duct system has an outlet; and an assembly of an inner element fitted inside an outer element, the outer element having a cup shape and the inner element having a shape that complements the cup shape for fitting in the outer element and forming the duct system such that all the fluid beverage ingredient between the inner and outer elements flows through the duct system, each element having a contact surface, wherein the contact surface of the inner element is configured to removably contact the contact surface of the outer element; and wherein the contact surface of at least the inner element has one or more recesses, wherein fitting the inner element into the outer element forms the one or more recesses into the duct system, wherein the duct system is configured to convey a fluid for pumping the fluid beverage ingredient, wherein the duct system comprises a main duct extending from a top to a bottom of the inner element and at least one subsidiary duct, wherein the main duct has a longitudinal axis and an entry portion into which the at least one subsidiary duct merges, and wherein the at least one subsidiary duct has a longitudinal axis and an end portion for merging into the main duct, and wherein the longitudinal axis of the subsidiary duct extends at an angle smaller than 90° with respect to the longitudinal axis of the main duct at a position where the subsidiary duct merges into the main duct, and wherein at least a portion of the main duct extending between the position and the outlet of the duct system has a constant cross-sectional area over its length.

6. The beverage maker according to claim 4, wherein the end portion of the subsidiary duct is restricted and the entry portion of the main duct is widened.

7. A beverage maker, comprising:
an outer element having a cup shape and internal and external surfaces; and
an inner element having a shape that complements the cup shape for fitting in the outer element and forming a duct system for conveying a fluid beverage ingredient such that all of the fluid beverage ingredient between the inner and outer elements flows through the duct system, the inner element further having an internal surface and an external surface, the external surface of the inner element having one or more recesses, wherein the external surface of the inner element is configured to removably contact the internal surface of the outer element;
the duct system being formed between the one or more recesses and the internal surface of the outer element when the inner element is fitted in the outer element,
wherein the outer element has an air inlet hole from the internal and external surfaces of the outer element near an open section of the outer element, and wherein the duct system is connected to the air inlet hole for letting in air, and
wherein the inner element is configured to fit inside the outer element when the external surface of the inner element removably contacts the internal surface of the outer element to form the duct system.

8. An assembly for making a beverage with at least one fluid ingredient, the assembly comprising:
inner and outer elements, the outer element having a cup shape and the inner element having a shape that complements the cup shape for fitting in the outer element and forming the duct system for conveying the at least one fluid ingredient such that all the at least one fluid beverage ingredient between the inner and outer elements flows through the duct system, each of the inner and outer elements having a contact surface, the contact surface of the inner element having one or more recesses, wherein the contact surface of the inner element is configured to removably contact the contact surface of the outer element;

the duct system being formed when the contact surfaces of the inner and outer elements are fitted for conveying the at least one fluid ingredient and including a main duct and a subsidiary duct intersecting with the main duct; and a steam generator, wherein the duct system includes at least one inlet member connected to the steam generator, wherein the inner element is configured to fit inside the outer element when the contact surface of the inner element removably contacts the contact surface of the outer element to form the duct system.

9. The assembly of claim 8, wherein the inner element is further configured to receive a quantity of the at least one fluid ingredient to be conveyed by the duct system.

10. A beverage maker, comprising:
a duct system for conveying a fluid; an inner element having a cup shape, a fluid inlet hole and a first contact surface having recesses; and
an outer element having a shape that complements the shape for fitting in the outer element and forming the duct system such that all the fluid between the inner and outer elements flows through the duct system, the outer element having a second contact surface for accepting the inner element to fit in the outer element, wherein the first contact surface of the inner element is configured to removably contact the second contact surface of the outer element;
the duct system being formed when the first contact surface removably contacts the second contact surface for receiving a fluid from the fluid inlet hole, the duct system including a main duct and a subsidiary duct intersecting the main duct at a position, at least a portion of the main duct extending between the position and the fluid inlet hole has a constant cross sectional area over its length,
wherein the subsidiary duct has a longitudinal axis and an end portion for merging into the main duct, and the main duct has a longitudinal axis and an entry portion into which the subsidiary duct merges, and
wherein the inner element is configured to fit inside the outer element when the first contact surface of the inner element removably contacts the second contact surface of the outer element to form the duct system.

11. A beverage maker, comprising:
an inner element having a cup shape and a first contact surface having recesses;
an outer element having and a second contact surface for accepting the inner element fit in the outer element, the outer element having a shape that complements the cup shape for forming a duct system for conveying a fluid when the first contact surface removably contacts the second contact surface such that all the fluid beverage ingredient between the inner and outer elements flows through the duct system; and
the duct system comprising a main duct and a subsidiary duct having a longitudinal axis and an end portion for merging into the main duct, the main duct having a longitudinal axis and an entry portion into which the subsidiary duct merges,
wherein the longitudinal axis of the subsidiary duct extends at an angle smaller than 90° with respect to the longitudinal axis of the main duct at a position where the subsidiary duct merges into the main duct, and wherein at least a portion of the main duct extending between the position and an outlet of the duct system has a constant cross-sectional area over its length, and
wherein the inner element is configured to fit inside the outer element when the second contact surface of the outer element accepts the inner element to be fitted in the outer element to form the duct system.

12. A beverage maker, comprising:

an outer element having a cup shape and internal and external surfaces;

an inner element having a shape the complements the cup shape for fitting in the outer element and forming a duct system for conveying a fluid beverage ingredient such that all the fluid beverage ingredient between the inner and outer elements flows through the duct system, the inner element further having an internal surface and an external surface, the external surface of the inner element having one or more recesses, wherein the external surface of the inner element is configured to removably contact the internal surface of the outer element; and the duct system being formed between the one or more recesses and the internal surface of the outer element when the inner element is fitted in the outer element, wherein the inner element has an inlet hole, wherein the duct system includes a main duct extending from an open section to the inlet hole and at least one subsidiary duct extending from a closed section of the inner element to intersect with the main duct at an intersection, an angle between central axes of the main and the subsidiary ducts at the intersection being less than 90°, and wherein the inner element is configured to fit inside the outer element when the external surface of the inner element removably contacts the internal surface of the outer element to form the duct system.

13. The beverage maker according to claim 1, wherein the inner element is configured to receive a quantity of the fluid beverage ingredient in a hollow container space of the internal surface of the inner element, the fluid beverage ingredient received in the hollow container space being configured to enter the duct system.

\* \* \* \* \*